United States Patent [19]

Johnson, Jr.

[11] 4,324,571
[45] Apr. 13, 1982

[54] BAG-TYPE FILTER APPARATUS WITH AIR DIFFUSER HAVING EXTENDED BAG SUPPORT

[76] Inventor: Allen S. Johnson, Jr., Post Office Drawer 1037, Salisbury, N.C. 28144

[21] Appl. No.: 247,254

[22] Filed: Mar. 25, 1981

Related U.S. Application Data

[63] Continuation-in-part of Ser. No. 76,942, Sep. 26, 1979, Pat. No. 4,259,095.

[51] Int. Cl.³ .............................................. B01D 46/04
[52] U.S. Cl. ........................................ 55/302; 55/379; 138/39; 138/177; 138/DIG. 11
[58] Field of Search ..................... 55/302, 341 R, 379; 138/39, 177, DIG. 11

[56] References Cited

U.S. PATENT DOCUMENTS

| | | | |
|---|---|---|---|
| 3,182,674 | 5/1965 | Horton | 138/39 X |
| 3,206,178 | 9/1965 | Lamb | 55/293 X |
| 3,291,310 | 12/1966 | Marvel | 55/379 X |
| 3,471,024 | 10/1969 | Doucet | 55/96 X |
| 3,633,753 | 1/1972 | Petitjeun | 55/379 X |
| 3,633,757 | 1/1972 | Madern | 55/379 X |
| 3,720,235 | 3/1973 | Schrock | 138/177 X |

*Primary Examiner*—Kathleen J. Prunner
*Attorney, Agent, or Firm*—Bell, Seltzer, Park & Gibson

[57] ABSTRACT

A bag-type filter apparatus, whose gas-permeable tubular filter bags are cleaned by a periodic reverse purge flow of air directed into one end of the filter bag, has a combination filter bag support and air diffuser for each filter bag and which is characterized in that the support holds the filter bag in an open tubular configuration throughout the length of the filter bag, but the air diffuser is of shorter length than the filter bag to more effectively clean the filter bag.

26 Claims, 9 Drawing Figures

BAG-TYPE FILTER APPARATUS WITH AIR DIFFUSER HAVING EXTENDED BAG SUPPORT

CROSS-REFERENCE TO RELATED APPLICATION

This application is a continuation-in-part of my copending United States application Ser. No. 06/076,942, filed Sept. 26, 1979, now U.S. Pat. No. 4,259,095 and entitled BAG-TYPE FILTER APPARATUS WITH COMBINATION BAG SUPPORT AND AIR DIFFUSER.

FIELD AND BACKGROUND OF THE INVENTION

This invention relates to "bag-type" filter apparatus, and more especially, to an improved combination tubular bag support and air diffuser means therefor.

As is generally known in the art, a bag-type filter apparatus generally includes a multiplicity of tubular filter bags mounted in a filter housing or "baghouse" with each filter bag having a tubular supporting frame or "cage" positioned therein so as to hold the filter bag in an open tubular configuration. Particulate-laden gas is directed into the filter housing and flows through the gas-permeable filter bags while the particulate material is filtered and retained on the exterior surfaces of the filter bags. Periodically, a reverse purge flow of air is directed into the outlet ends of the tubular filter bags for dislodging trapped particulate material from the filter bags and thus cleaning the filter bags.

One problem with this type of filter apparatus is that the cleaning operation is not very effective in removing particulate material from the filter bags. After the filter bags have been in use for a period of time, they become increasingly clogged with particulate material. This undesirably increases the pressure drop across the filter apparatus and significantly reduces its efficiency. In some filter applications, the inability to effectively clean the filter bags of the particulate material is so severe that it is necessary to frequently replace the filter bags. Also, as a result of the particulate material trapped on the filter bags and the resulting obstruction to air flow, the filter apparatus must be designed with a relatively large number of filter bags and with a relatively low ratio or air flow to filter area in order that the filter apparatus will remain serviceable as the filter bags become increasingly clogged with particulate material.

The presence of particulate material on the filter bags also causes abrasive wear of the bags and results in a shortened useful life. Typically, a filter bag will have a useful life of up to about two years. However, in severe applications, as for example where the particulate material is of a highly abrasive nature, the filter bags may wear out in a matter of weeks. Considering that the usual filter apparatus may contain many hundreds of filter bags, and that a single bag may cost from fifty to one hundred dollars, the cost of continually replacing the filter bags makes the operational cost of the filter apparatus quite high. Yet, in many applications the use of filtration apparatus is required by governmental air quality standards in order to limit the amount of particulate material in effluent gases.

In my U.S. Pat. No. 4,231,770, dated Nov. 4, 1980, I have disclosed an improvement in a bag-type filter apparatus which provides significantly more effective cleaning of a filter bag when a periodic reverse purge of air is directed into the filter bag. As disclosed in said patent, a hollow diffuser tube is provided interiorly of the conventional supporting cage provided within the filter bag for supporting and holding the filter bag in an open tubular configuration. The diffuser tube has one end thereof communicating with the outlet end of the filter bag and has perforations therein located for diffusing and distributing air throughout the filter bag when a periodic reverse purge of air is directed into the outlet end of the filter bag. The more uniform distribution of the purge of air throughout the filter bag provides considerably more effective cleaning of the filter bag than has heretofore been possible in a conventional bag-type filter system.

The diffuser tube of said patent is particularly suited for installation in a filter which is already equipped with a cage for supporting and holding the filter bag. In my aforementioned copending U.S. application, Ser. No. 06/076,942, I have provided within the filter bag a device which serves as a cage for supporting and holding the filter bag in an open tubular configuration and also serves for diffusing and distributing throughout the filter bag the reverse purge of cleaning air which is periodically directed into the filter bag.

More particularly, said copending application discloses a device in the form of an elongate tube extending longitudinally within a filter bag and having a series of spaced peripheral portions extending generally outwardly beyond intervening other portions of the tube and serving as a cage for engaging the surrounding filter bag and holding the same in a generally open tubular configuration substantially out of contact with the portions of the tube located inwardly therefrom. Those inwardly located portions of the tube have perforations therein located for diffusing and distributing air throughout the filter bag when a periodic reverse purge of air is directed into the tube. Thus, the device of said copending application serves as a combination bag support and air diffuser when installed within a conventional tubular filter bag.

It has now been determined that, at least in the case of some of the more common sizes of tubular filter bags now being used, e.g., tubular filter bags up to about ten feet (3.048 meters) long and up to about six inches (15.24 cm) in diameter, the cleaning of such filter bags is considerably enhanced by utilizing a perforate air diffuser tube which is substantially shorter than the filter bag, and is thus substantially shorter than the internal tubular support or "cage" for the filter bag. Stated otherwise, an exemplary perforate air diffuser tube was of a length substantially less than that of the filter bag, but was of a length greater than about one-half that of the filter bag. In the cleaning of filter bags in the sizes mentioned above, very good results have been achieved by providing an air diffuser tube of a length within about 60 to 75 percent of the overall length of the filter bag and the supporting frame or "cage" therewithin.

SUMMARY OF THE INVENTION

It is, therefore, an object of this invention to provide a combination filter bag support and air diffuser wherein the filter bag is supported throughout its length but wherein the air diffuser is of shorter length than the filter bag so as to more effectively clean the filter bag.

It is a more specific object of this invention to provide a filter apparatus of the type described with an improved combination support and air diffuser means in the form of first and second axially aligned tube sections, each having a series of outwardly extending spaced peripheral portions thereon for engaging the adjacent surrounding portion of the filter bag and holding the same in a generally open tubular configuration substantially out of contact with intervening other portions of each tube section, wherein the intervening portions of the first tube section have perforations therein located for diffusing and distributing air along the filter bag when a periodic reverse purge flow of air is directed into the first tube section, and wherein the intervening other portions of the second tube section are open to the flow of air therethrough so that the second tube section serves only to hold the adjacent surrounding portion of the filter bag in generally open tubular configuration without effecting any significant diffusion or distribution of the air flowing through the second tube section during the periodic reverse purge.

According to one embodiment of the invention as illustrated herein, the series of outwardly extending peripheral portions of each tube section of the improved combination bag support and air diffuser means, hereinafter termed support-diffuser tube means, are in the form of longitudinally extending fins projecting radially outwardly at spaced locations about the periphery of each respective tube section for supporting and holding the adjacent surrounding portion of the filter bag in a generally open tubular configuration substantially out of contact with the intervening inwardly positioned portions of each respective tube section. The perforations are located in the intervening inwardly positioned portions of the first tube section for diffusing and distributing air along the filter bag when a periodic reverse purge flow of air is directed into the first tube section at its end remote from the second tube section, and the intervening inwardly positioned other portions of the second tube section are open to the flow of air therethrough between the outwardly projecting fins so that the second tube section serves only to hold the adjacent surrounding portion of the filter bag in a generally open tubular configuration without effecting any significant diffusion or distribution of the air during the periodic reverse purge.

In accordance with another embodiment of the invention, the support-diffuser tube means is of longitudinally corrugated form in cross-section having a series of longitudinally extending peaks defining intervening longitudinally extending inwardly located troughs therebetween at spaced locations about the periphery of the tube means. The series of longitudinally extending peaks serves for engaging the surrounding filter bag and holding the same in a generally open tubular configuration substantially out of contact with the inwardly located troughs of the tube means. The troughs of a first tube section of the support-diffuser tube means have perforations therein located for diffusing and distributing air along the filter bag when a reverse purge flow of air is directed into the first tube section at its end remote from the respective second tube section, and the second tube section is of open construction between the peaks so that the second tube section serves only to hold the adjacent surrounding portion of the filter bag in the generally open tubular configuration without effecting any significant air diffusion or distribution of the air during the periodic reverse purge.

BRIEF DESCRIPTION OF THE DRAWINGS

Some of the objects and advantages of the invention having been stated, others will appear as the description proceeds when taken in connection with the accompanying drawings, in which.

DETAILED DESCRIPTION

Figures 1, 2:
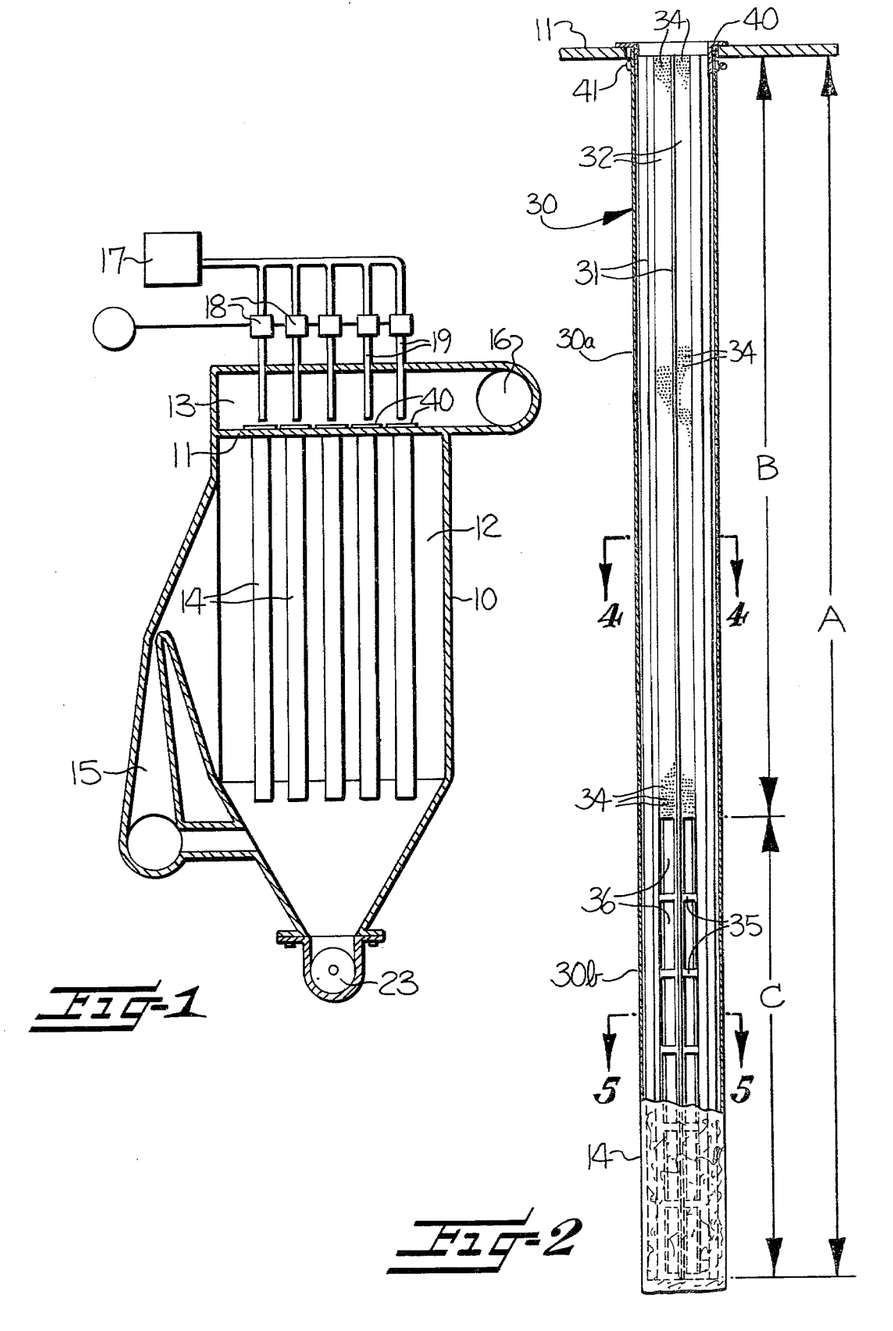
FIG. 1 is a cross-sectional view of a filter apparatus of the type employing a plurality of bag-type tubular filters.
FIG. 2 is an enlarged side elevation of a first or preferred embodiment of the improved combination bag support and air diffuser means of the present invention with the filter bag broken away.

Referring more specifically to the drawings, FIG. 1 illustrates a conventional filter apparatus of the type utilizing elongate bag-like tubular filters. The filter apparatus includes a filter housing 10, commonly referred to as a "baghouse," which is divided by a horizontal wall 11 into a lower filtering chamber 12 and an upper filtered air plenum 13. A plurality of elongate hollow tubular filter bags 14 are mounted in the filtering chamber 12 in a generally vertical orientation with the upper ends thereof communicating with the filtered air plenum 13 via holes (see FIG. 2) provided in the wall 11.

An inlet duct 15 directs particulate-laden gas into the filtering chamber 12, where it passes around the respective filter bags 14 and then flows through the gas-permeable filter bags while the particulate material is filtered and retained on the exterior surfaces of the filter bags. After passing into the hollow interior of the filter bags 14, the filtered gas passes upwardly through the outlet ends of the respective filter bags and into the filtered air chamber 13. From there, the filtered gas is directed to and through an outlet duct 16.

As the particulate material builds up on the exterior surfaces of the filter bags 14, it becomes necessary to clean the filter bags and dislodge the accumulated particulate material therefrom. This is accomplished by periodically directing a purging flow of air through the filter bags in a reverse direction. In the illustrated filter apparatus, purge air from a compressed air source 17 is directed via control valves 18, through compressed air lines 19, and thus into the outlet ends of the respective filter bags 14 with the purge air thus entering the filter bags in a reverse direction. The particulate material dislodged from the filter bags is accumulated at the lower end of the filter housing 10 and may be removed by a screw conveyor 23.

The filter cleaning system utilized in the filtration apparatus illustrated in FIG. 1 is of the type wherein compressed air conduits are associated with the outlet ends of each of the respective filter bags so as to selectively direct a pulse jet of compressed air into respective filter bags. In another known type of cleaning system for this type of filter apparatus, all of the tubular filter bags associated with the filtered air plenum 13 are simultaneously purged with a pulse of compressed air. Still another known type of cleaning system utilizes a reverse flow of air of relatively longer duration, rather than a pulse of air, for cleaning the filter bags. As will become apparent as the description proceeds, the present invention is applicable to all of these known types of cleaning systems.

Referring now to FIGS. 2-5, a first embodiment of the improved combination bag support and air diffuser means, constructed in accordance with the present invention, is broadly designated at 30. At the outset, it should be noted that the support-diffuser tube means 30 is constructed in such a manner as to serve not only for supporting and holding the respective filter bag 14 in an open tubular configuration throughout its length, but to also serve as an air diffuser tube for a substantial portion of the length of the filter bag, but not the entire length of the filter bag, so as to diffuse and distribute air along the filter bag when a periodic reverse purge flow of air is directed into the filter bag. Accordingly, although it is preferred that the support-diffuser tube means 30 is integrally formed throughout its length from a single piece of sheet metal or other sheet material, for the purposes of description, the support-diffuser tube means 30 will be considered as being composed of a pair of first and second, axially aligned, elongate tube sections 30a, 30b. The first and second tube sections 30a, 30b are of a combined overall length, indicated at A (FIG. 2), of about the same length as the entire length of the filter bag 14, and the first tube section 30a is of a length B at least about one-half the combined length A of both the first and second tube sections 30a, 30b and preferably of a length within about 60 to 75 percent of the combined length of the first and second tube sections 30a, 30b. It follows that the second tube section 30b is preferably of a length C (FIG. 2) within about 25 to 40 percent of the combined length A of the first and second tube sections 30a, 30b of the support-diffuser tube means 30.

As illustrated, the support-diffuser tube means 30 includes a series of spaced peripheral portions which extend generally outwardly beyond intervening other portions of the tube means 30 and serve for engaging the surrounding filter bag and holding the same in a generally open tubular configuration. More particularly, in the embodiment of the invention illustrated in FIGS. 2-5, it will be observed that each tube section 30a, 30b is provided with spaced outwardly projecting peripheral portions in the form of relatively narrow blade-like fins 31 which project outwardly beyond the inwardly located intervening portions 32 of the respective tube sections. The fins 31 are longitudinally coextensive with the respective tube sections and project outwardly in a substantially radial direction. The fins 31 are of substantially uniform height and substantially equally spaced apart about the circumference of the tube sections, it being noted that the spaced peripheral portions or fins 31 in each tube section preferably are in alignment and are preferably continuous throughout the overall length A of the support-diffuser tube means 30.

As illustrated, the fins 31 of each tube section 30a, 30b are integrally formed with the inwardly located portions 32 of the respective tube section and are formed by the wall of the respective tube section being folded back upon itself. Preferably, and as is illustrated, the outermost edge of each fin 31 has an enlarged rounded or bulbous formation 33 formed therein to provide a rounded, smooth surface for engagement with the surrounding portion of the filter bag so as to reduce wear on the filter bag in this area.

Figures 3, 4, 5:
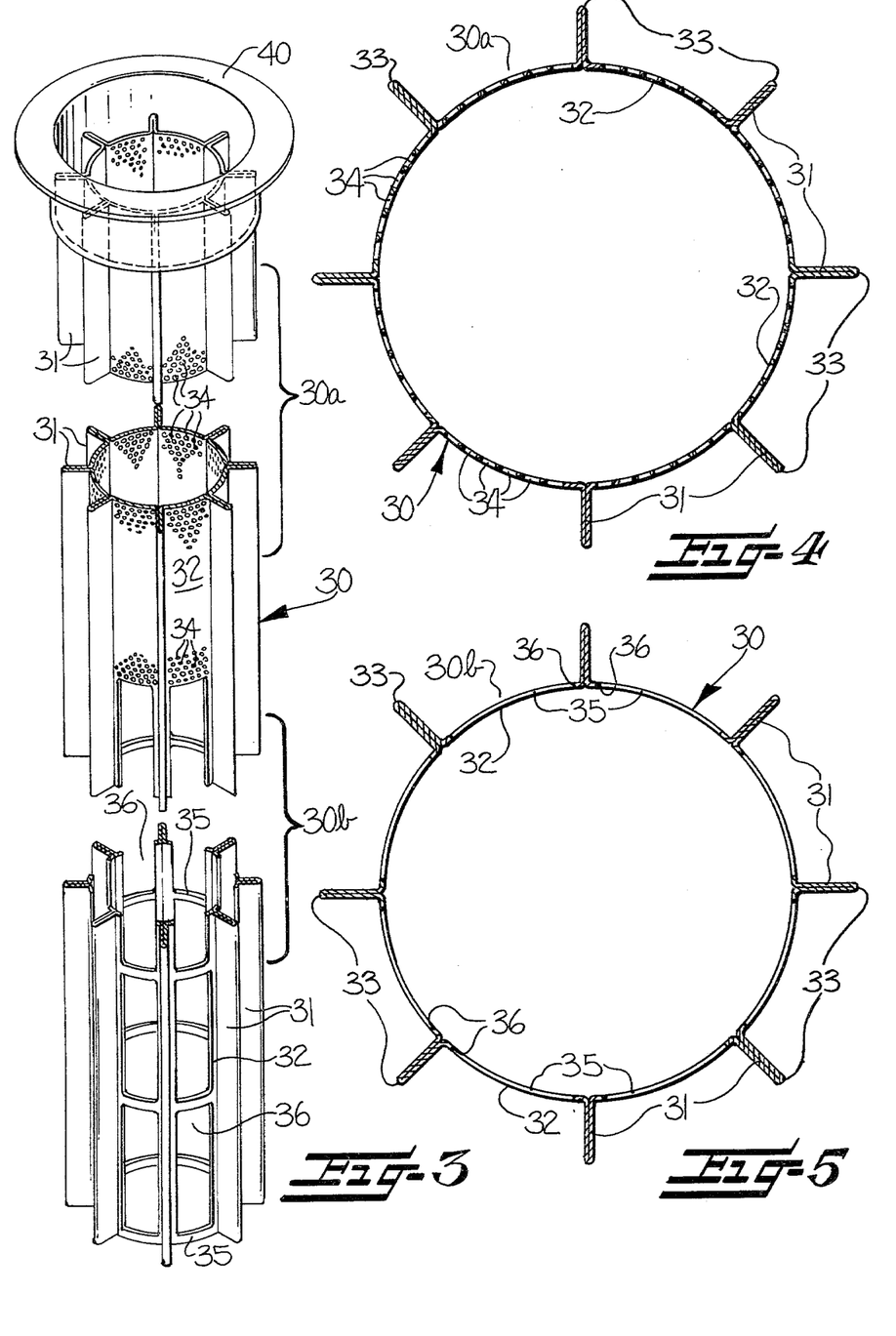
FIG. 3 is a perspective view, with parts broken away, also showing the first embodiment of the combination bag support and air diffuser tube means of the present invention.
FIGS. 4 and 5 are enlarged sectional views taken substantially along the respective lines 4—4 and 5—5 of FIG. 2.

As illustrated, the inwardly located portions 32 of the upper or first tube section 30a have perforations 34 formed therein, with the fins 31 being unperforated. In accordance with the present invention, it is important to note that the lower or second tube section 30b differs largely from the upper or first tube section 30a in that only a minimum amount of material in the inwardly located portions 32 of the second tube section is retained between the outwardly projecting fins 31. That is, it is preferred that only sufficient material is provided between the adjacent fins in the lower or second tube section 30b to provide adequate support for the outwardly projecting fins 31 of the second tube section so that the inwardly located portions 32 of the second tube section 30b are open to the flow of air therethrough as it is discharged through the lower end of the first tube section 30a during each periodic reverse purge. Thus, it can be seen in FIGS. 3 and 5 that the inwardly located portions 32 of the second tube section 30b comprise a plurality of longitudinally spaced, relatively narrow strips 35 extending laterally between and interconnecting the inward portions of adjacent peripheral portions or fins 31 of the second tube section 30b and defining relatively large openings 36 therebetween. As best shown in FIGS. 3, 4 and 5, the fins 31 extend in a direction generally parallel to the longitudinal axis of the tube sections 30a, 30b, and the fins 31 are of such size and spacing as to hold the filter bag 14 (see FIG. 2) in an open tubular configuration substantially out of contact with the inwardly located portions 32 of the support-diffuser tube means 30.

During the normal filtering operation, the perforations 34 and the relatively large openings 36 in the respective tube sections 30a, 30b permit the filtered air which passes through the filter bag 14 to flow inwardly into the hollow interior portions of the tube sections 30a, 30b where the filtered air may then flow upwardly or outwardly into the filtered air manifold 13 (FIG. 1). During the cleaning operation when a blast or pulse of reverse purge air is directed into the hollow interior of the support-diffuser tube means 30, the perforations 34 in the inwardly located portions 32 of the first tube section 30a serve for diffusing and distributing the reverse purge of air along the filter bag 14 so that all portions of the filter bag are effectively cleaned by the reverse purge of air. At the same time, the relatively large openings 36 in the lower or second tube section 30b permit the reverse purge air to flow freely through the intervening inwardly located portions 32 of the second tube section 30b so that the second tube section 30b serves only to hold the adjacent surrounding portion of the filter bag in generally open tubular configuration without effecting any significant diffusion or distribution of the purge air flowing through the second tube section 30b during the periodic reverse purge.

At the upper end of the support-diffuser tube means 30, which serves as the outlet for the filtered air in the arrangement illustrated in FIG. 1, there is provided an annular end ring 40, the inner diameter of which corresponds substantially with the outer diameter of the tube sections 30a, 30b. The outer extent of the end ring 40 projects beyond the outermost edges of the fins 31 at the corresponding end of the first tube section 30a for providing a flange at the upper end of the tube means 30 (see FIGS. 2 and 3) to assist in mounting the tube means 30 to the wall 11 of the baghouse. A circumferential band 41 may be provided at the upper end of the tube means 30 underlying the end ring 40 and surrounding the fins 31. This band 41 serves to facilitate mounting the filter bag 14 to the tube means 30. The lower end of the lower or second tube section 30b may be open, as shown in FIG. 3, or if desired, it may be closed by a suitable end cap, not shown.

The support-diffuser tube means 30 may be formed of any suitable material capable of withstanding the conditions to which the filter system is subjected. A ductile metallic sheet metal, such as steel or stainless steel, is particularly suitable for fabricating a support-diffuser tube means 30 in the formations specifically illustrated herein, but those skilled in the art will readily appreciate that other materials and other methods of manufacture may be suitably employed in producing a support-diffuser tube means 30 within the scope and spirit of the invention.

In the embodiment illustrated in FIGS. 2–5, the perforations 34 are shown as being of a substantially uniform size and spacing throughout the extent of each inwardly located portion 32 of the first tube section 30a. Preferably, the size and spacing of the perforations 34 are such that the inwardly located portions 32 of the first tube section 30a collectively have a void area of from about 35 percent to about 50 percent. Typically, the diameter of the perforations 34 may be about one-eighth inch (3.18 mm). It is preferred that the perforations 34 in the first tube section 30a are uniformly arranged to provide a substantially uniform void area throughout the longitudinal extent of the first tube section 30a. In some instances, however, depending upon the length and diameter of the filter bag and other factors, it may be desirable for the void area defined by the perforations to vary over the length of the first or upper tube section 30a of the elongate support-diffuser tube means 30.

From the foregoing description, it can be seen that approximately 25–40 percent of the length of the support-diffuser tube means 30, along that end thereof remote from the outlet end of the respective filter tube 14, is essentially open to the flow of air therethrough. Thus, it has been determined that, as a periodic reverse purge flow of air is directed into the outlet end of the filter tube 14, the air flows along the first tube section 30a and outwardly through the relatively small openings or holes 34 in the first tube section 30a, while at the same time, the purge air flows along and out of the lower end of the first tube section 30a and thus expands and flows outwardly through the relatively large openings 36 in the lower or second tube section 30b to effectively dislodge the particulate material from the filter bag 14 throughout its length.

The combination bag support and air diffuser tube means 30 of the present invention performs the functions of diffusing and distributing the reverse purge pulse or blast of cleaning air over the entire filter bag 14 to thus provide effective and efficient cleaning of the filter bag. As a result of the enhanced cleaning, the volume of air which can flow through the filter bag at a given pressure drop operation is substantially increased. The support-diffuser tube means 30 of this invention also has the advantage as set forth in my said U.S. Pat. No. 4,231,770 and my said copending application, Ser. No. 06/076,942, in that the concentration of the cleaning air pulse adjacent the outlet end of the filter bag under the earlier prior conventional arrangement is substantially eliminated, thus avoiding excessive flexing of the filter bag and abrasive wear thereof, and thereby contributing to an increased useful life of the filter bag.

In FIGS. 6–9, the reference character 50 generally designates a support-diffuser tube means constructed in accordance with a second embodiment of the invention. As in the previously described embodiment, the support-diffuser tube means 50 has a series of spaced peripheral portions which extend generally outwardly beyond intervening other portions of the tube means 50 and serve for engaging the surrounding filter bag and holding the same in a generally open tubular configuration, and these outwardly extending peripheral portions also serve for holding the filter bag substantially out of contact with the inwardly located portions of the tube means 50.

In this embodiment of the invention, the support-diffuser tube means 50 also comprises a pair of substantially axially aligned first and second, or upper and lower, elongate tube sections 30a', 30b', which are of a combined length about the same as the entire length of the respective filter bag 14', with the first tube section 30a' being of a length at least about one-half the combined length of both the first and second tube sections 30a', 30b' and preferably of a length within about 60 to 75 percent of the combined length of the first and second tube sections 30a', 30b', as is the case with respect to the first embodiment of the invention.

The second embodiment of the support-diffuser tube means 50 differs essentially from the first embodiment of the support-diffuser tube means 30 in that the first and second tube sections 30a', 30b' of the support-diffuser tube means 50 are of a longitudinally corrugated construction having a series of spaced longitudinally extending peaks 51 with longitudinally extending intervening troughs 52 formed therebetween and located inwardly of the peaks 51. The peaks 51 of each tube section 30a', 30b' are of such a height and spacing in relation to the troughs 52 as to hold the filter bag 14' substantially out of contact with the troughs 52. As illustrated, perforations 54 are provided in those troughs 52 of the first tube section 30a' for diffusing and distributing air along the filter bag when a reverse purge flow of air is directed into the open end of the first tube section 30a' remote from the second tube section 30b'. However, the troughs 52 of the second or lower tube section 30b' are of open construction and include relatively narrow longitudinally spaced transverse strips 55 spaced therealong which define a plurality of longitudinally extending relatively large openings 56 along the troughs 52 between the peaks 51. Thus, the second tube section is adapted to serve only to hold the adjacent surrounding portion of the filter bag 14' in the generally open tubular configuration without effecting any significant air diffusion or distribution of the air flowing through the second tube section 30b' during the periodic reverse purge.

Figure 6:
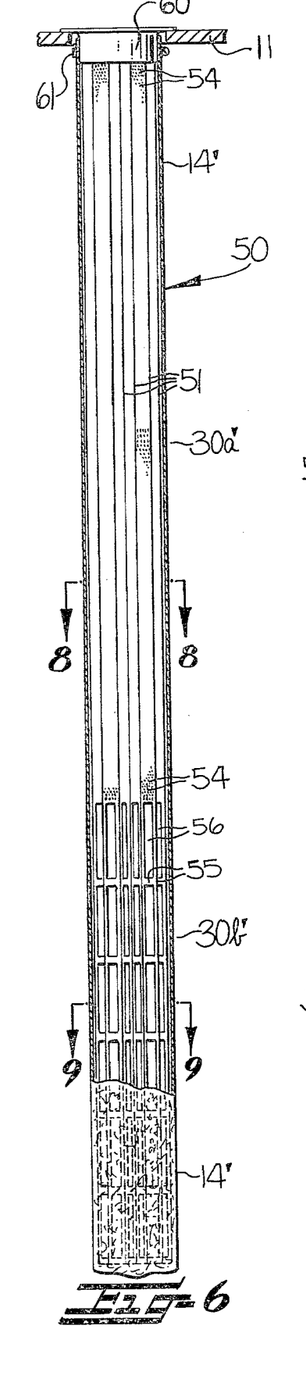
FIGS. 6 and 7 are views similar to the respective FIGS. 2 and 3 showing a combination bag support and air diffuser tube means constructed in accordance with a second embodiment of the invention.
Figures 7, 8, 9:
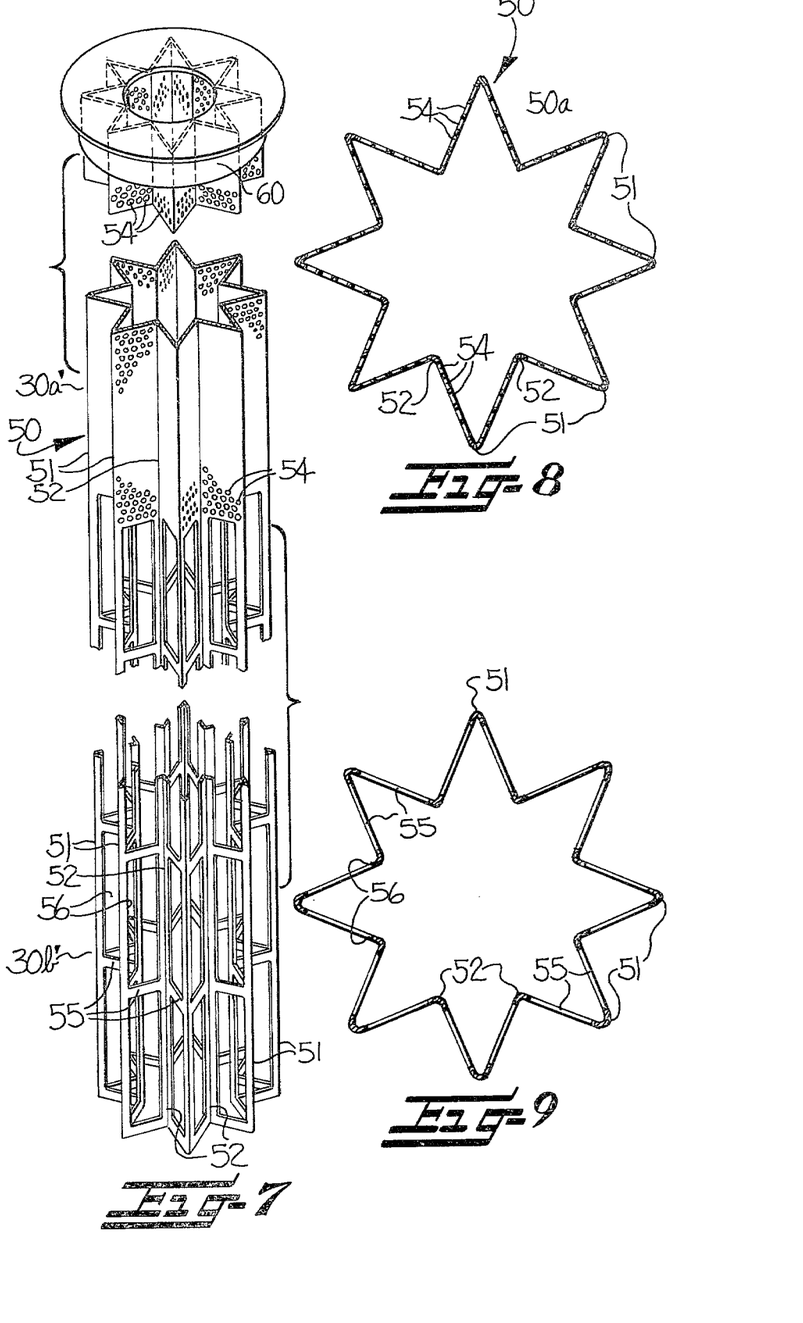
FIGS. 8 and 9 are enlarged sectional views taken substantially along the respective lines 8—8 and 9—9 of FIG. 6.

As in the first embodiment, the elongate support-diffuser tube means 50 has an annular ring 60 at the upper or outlet end thereof, with the outer extent of the ring 60 projecting beyond the outermost edges of the peaks 51 to provide a flange to assist in mounting the tube means 50 to the wall 11 of the baghouse. A circumferential band 61 is provided at the upper end of the tube means 50 underlying the end ring 60 and surrounding the peaks 51. This band 61 serves to facilitate mounting the filter bag 14' to the tube means 50.

It is thus seen that I have provided embodiments of a combination filter bag support and air diffuser, in each embodiment of which the filter bag is supported throughout its length by a cage-like structure which preferably is formed integrally with the diffuser, but wherein the diffuser is of shorter length than the filter bag and the cage-like structure so as to diffuse and distribute reverse purge air along the filter bag while permitting the reverse purge air to flow freely through the length of the filter bag extending beyond the diffuser without effecting any significant diffusion or distribution of the air flowing through the latter length of the filter bag.

In the drawings and specification there have been set forth preferred embodiments of the invention, and although specific terms are employed, they are used in a generic and descriptive sense only and not for purposes of limitation, the scope of the invention being defined in the claims.

That which is claimed is:

1. In a filter apparatus of the type wherein a particulate-laden gas is directed through a tubular filter bag for filtering and retaining the particulate material on the exterior of the filter bag, and wherein the filter bag is cleaned by a periodic reverse purge flow of air directed into one end of the filter bag, the combination therewith of means positioned within said filter bag and serving for supporting and holding the filter bag in an open tubular configuration and for also diffusing and distributing air throughout the filter bag when a periodic reverse purge flow of air is directed into the filter bag so as to thereby more effectively clean the filter bag while also reducing excessive flexing of the filter bag and abrasive wear thereof, said means comprising an elongate tube means extending longitudinally within said filter bag and including substantially axially aligned first and second elongate tube sections, each tube section having a series of spaced peripheral portions extending generally outwardly beyond other portions of the respective tube section and serving for engaging the adjacent portion of the filter bag and holding the same in a generally open tubular configuration substantially out of contact with said other portions of each tube section, said other portions of the first tube section having perforations therein located for diffusing and distributing air along the filter bag when a periodic reverse purge flow of air is directed into said first tube section at its end remote from said second tube section, and said other portions of said second tube section being open to the flow of air therethrough between adjacent peripheral portions thereof so that the second tube section serves only to hold the adjacent surrounding portion of the filter bag in generally open tubular configuration without effecting any significant diffusion or distribution of the air during the periodic reverse purge.

2. The combination as set forth in claim 1 wherein said first tube section is of a length at least about one-half the combined length of both said first and second tube sections.

3. The combination as set forth in claim 1 wherein said first and second tube sections are of a combined length such as to extend within approximately the entire length of said filter bag, and wherein said first tube section is of a length within about 60 to 75 percent of the combined length of said first and second tube sections.

4. The combination as set forth in claim 1 wherein said other portions of said second tube section which are open to the flow of air therethrough comprise spaced strips extending laterally between and interconnecting the inward portions of adjacent peripheral portions of said second tube section and defining relatively large openings therebetween.

5. The combination as set forth in claim 1 wherein said first and second tube sections are integrally formed of sheet material and wherein the series of spaced peripheral portions in each tube section are in alignment and are continuous throughout the overall length of said tube means.

6. The combination as set forth in claim 1 wherein said series of spaced peripheral portions of each tube section are of substantially uniform height and are substantially uniformly spaced apart about the periphery of the respective tube section.

7. The combination as set forth in claim 6 wherein said series of peripheral portions are longitudinally coextensive with said tube sections and extend in a direction generally parallel to the longitudinal axis of said tube sections.

8. The combination as set forth in claim 1 wherein each series of spaced peripheral portions comprises a series of longitudinally extending fins projecting radially outwardly beyond said other portions of each tube section.

9. The combination as set forth in claim 8 wherein the outwardly projecting fins of each series are of substantially uniform height and are substantially uniformly spaced from one another about the periphery of the respective tube section.

10. The combination as set forth in claim 1 wherein each tube section is of corrugated construction including longitudinally extending peaks at spaced locations about the periphery of the respective tube section and longitudinally extending inwardly located troughs between said peaks, and wherein said spaced peripheral portions of each tube section are defined as outwardly extending peripheral projections by the respective peaks.

11. The combination as set forth in claim 1 wherein said perforations in said first tube section are uniformly arranged to provide a substantially uniform void area throughout the longitudinal extent of said first tube section.

12. In a filter apparatus of the type wherein a particulate-laden gas is directed through a tubular filter bag for filtering and retaining the particulate material on the exterior of the filter bag, and wherein the filter bag is cleaned by a periodic reverse purge of air directed into one end of the filter bag, the combination therewith of means positioned within said filter bag and serving for supporting and holding the filter bag in an open tubular configuration and for also diffusing and distributing air throughout the filter bag when a periodic reverse purge flow of air is directed into the filter bag so as to thereby more effectively clean the filter bag while also reducing excessive flexing of the filter bag and abrasive wear thereof, said means comprising an elongate tube means extending longitudinally within said filter bag and including a pair of substantially axially aligned tube sections, each tube section having a series of longitudinally extending outwardly projecting fins integrally formed therewith at spaced locations about the periphery of the respective tube section and serving for engaging the adjacent surrounding portion of the filter bag and holding the same in a generally open tubular configuration substantially out of contact with those inwardly positioned portions of the respective tube section located between said fins, said inwardly positioned portions of one of said tube sections having perforations therein located for diffusing and distributing air along the filter bag when a periodic reverse purge of air is directed into said one of said tube sections adjacent said one end of the filter bag, said one tube section being of substantially greater length than the other of said tube sections, and said inwardly positioned other portions of said other tube section being open to the flow of air therethrough between said outwardly projecting fins so that said other tube section serves only to hold the adjacent surrounding portion of the filter bag in a generally open tubular configuration without effecting any significant air diffusion or distribution of the air during the periodic reverse purge.

13. In a filter apparatus of the type wherein a particulate-laden gas is directed through a tubular filter bag for filtering and retaining the particulate material on the exterior of the filter bag, and wherein the filter bag is cleaned by a periodic reverse purge flow of air directed into one end of the filter bag, the combination therewith of means positioned within said filter bag and serving for supporting and holding the filter bag in an open tubular configuration and for also diffusing and distributing air throughout the filter bag when a periodic reverse purge flow of air is directed into the filter bag so as to thereby more effectively clean the filter bag while also reducing excessive flexing of the filter bag and abrasive wear thereof, said means comprising an elongate longitudinally corrugated tube means having a series of longitudinally extending peaks at spaced locations about the periphery of the tube means, said tube means including a pair of substantially axially aligned tube sections, one of said tube sections constituting a major portion of the length of said tube means, both tube sections having longitudinally extending troughs located inwardly of and between said peaks, said series of longitudinally extending peaks serving for engaging the surrounding filter bag and holding the same in an open generally tubular configuration substantially out of contact with the troughs of said tube sections, said troughs of said one tube section having perforations therein located for diffusing and distributing air along the adjacent surrounding portion of the filter bag when a periodic reverse purge flow of air is directed into said one tube section of said tube means, and said troughs of the other of said tube sections being of open construction between said peaks so that said other tube section serves only to hold the adjacent surrounding portion of the filter bag in the generally open tubular configuration without effecting any significant air diffusion or distribution of the air during the periodic reverse purge.

14. A combination support and air diffuser adapted to be positioned within a tubular filter bag of a filter apparatus of the type in which a particulate-laden gas is directed through the tubular filter bag for filtering and retaining the particulate material on the exterior of the filter bag, and wherein the filter bag is adapted to be cleaned by a periodic reverse purge flow of air directed into one end of the filter bag, said support and air diffuser being adapted to support and hold the filter bag in an open tubular configuration and to diffuse and distribute air throughout the filter bag when a periodic reverse purge flow of air is directed into the filter bag so as to thereby more effectively clean the filter bag while also being adapted to reduce excessive flexing of the filter bag and abrasive wear thereof, said combination support and air diffuser comprising an elongate tube adapted to extend longitudinally within the filter bag and including substantially axially aligned first and second elongate tube sections, each tube section having a series of spaced peripheral portions extending generally outwardly beyond other portions of the respective tube section and adapted to serve for engaging an adjacent surrounding portion of the filter bag and holding the same in a generally open tubular configuration substantially out of contact with said other portions of each tube section, said other portions of said first tube section having perforations therein adapted to diffuse and distribute air along the filter bag when a periodic reverse purge flow of air is directed into said first tube section at its end remote from said second tube section, and said other portions of said second tube section being open to the flow of air therethrough between adjacent peripheral portions thereof so that the second tube section is adapted to serve only to hold the adjacent surrounding portion of the filter bag in generally open tubular configuration without effecting any significant diffusion or distribution of the air during a periodic reverse purge.

15. The combination as set forth in claim 14 wherein said first tube section is of a length at least about one-half the combined length of both said first and second tube sections.

16. The combination as set forth in claim 14 wherein said first and second tube sections are of a combined length such that they are adapted to extend within approximately the entire length of the filter bag, and wherein said first tube section is of a length within about 60 to 75 percent of the combined length of said first and second tube sections.

17. The combination as set forth in claim 14 wherein said other portions of said second tube section which are open to the flow of air therethrough comprise spaced strips extending laterally between and interconnecting the inward portions of adjacent peripheral portions of said second tube section and defining relatively large openings therebetween.

18. The combination as set forth in claim 14 wherein said first and second tube sections are integrally formed of sheet material and wherein the series of spaced peripheral portions in each tube section are in alignment and are continuous throughout the overall length of said tube.

19. The combination as set forth in claim 14 wherein said series of spaced peripheral portions of each tube section are of substantially uniform height and are substantially uniformly spaced apart about the periphery of the respective tube section.

20. The combination as set forth in claim 19 wherein said series of peripheral portions are longitudinally coextensive with said tube sections and extend in a direction generally parallel to the longitudinal axis of said tube sections.

21. The combination as set forth in claim 14 wherein each series of spaced peripheral portions comprises a series of longitudinally extending fins projecting radially outwardly beyond said other portions of each tube section.

22. The combination as set forth in claim 21 wherein the outwardly projecting fins of each series are of substantially uniform height and are substantially uniformly spaced from one another about the periphery of the respective tube section.

23. The combination as set forth in claim 14 wherein each tube section is of corrugated construction including longitudinally extending peaks at spaced locations about the periphery of the respective tube section and longitudinally extending inwardly located troughs between said peaks, and wherein said spaced peripheral portions of each tube section are defined as outwardly extending peripheral projections by the respective peaks.

24. The combination as set forth in claim 14 wherein said perforations in said first tube section are uniformly arranged to provide a substantially uniform void area throughout the longitudinal extent of said first tube section.

25. A combination support and air diffuser adapted to be positioned within a tubular filter bag of a filter apparatus of the type in which a particulate-laden gas is directed through the tubular filter bag for filtering and retaining the particulate material on the exterior of the filter bag, and wherein the filter bag is adapted to be cleaned by a periodic reverse purge flow of air directed into one end of the filter bag, said support and air diffuser being adapted to support and hold the filter bag in an open tubular configuration and to diffuse and distribute air throughout the filter bag when a periodic reverse purge flow of air is directed into the filter bag so as to thereby more effectively clean the filter bag while also being adapted to reduce excessive flexing of the filter bag and abrasive wear thereof, said combination support and air diffuser comprising an elongate tube adapted to extend longitudinally within the filter bag and including a pair of substantially axially aligned tube sections, each tube section having a series of longitudinally extending outwardly projecting fins integrally formed therewith at spaced locations about the periphery of the respective tube section and adapted to serve for engaging an adjacent surrounding portion of the filter bag and holding the same in a generally open tubular configuration substantially out of contact with those inwardly positioned portions of the respective tube section located between said fins, said inwardly positioned portions of one of said tube sections having perforations therein located and adapted for diffusing and distributing air along the filter bag when a periodic reverse purge flow of air is directed into said one of said tube sections adjacent said one end of the filter bag, said one tube section being of substantially greater length than the other of said tube sections, and said inwardly positioned other portions of said other tube section being open to the flow of air therethrough between said outwardly projecting fins so that said other tube section is adapted to serve only to hold the adjacent surrounding portion of the filter bag in a generally open tubular configuration without effecting any significant air diffusion or distribution of the air during the periodic reverse purge.

26. A combination support and air diffuser adapted to be positioned within a tubular filter bag of a filter apparatus of the type in which a particulate-laden gas is directed through the tubular filter bag for filtering and retaining the particulate material on the exterior of the filter bag, and wherein the filter bag is adapted to be cleaned by a periodic reverse purge flow of air directed into one end of the filter bag, said support and air diffuser being adapted to support and hold the filter bag in an open tubular configuration and to diffuse and distribute air throughout the filter bag when a periodic reverse purge flow of air is directed into the filter bag so as to thereby more effectively clean the filter bag while also being adapted to reduce excessive flexing of the filter bag and abrasive wear thereof, said combination support and air diffuser comprising an elongate longitudinally corrugated tube having a series of longitudinally extending peaks at spaced locations about the periphery of the tube, said tube including a pair of tube sections, one of said tube sections constituting a major portion of the length of said tube, both tube sections having longitudinally extending troughs located inwardly of and between said peaks, said series of longitudinally extending peaks being adapted to engage a surrounding filter bag and to hold the same in an open generally tubular configuration substantially out of contact with the troughs of said tube sections, said troughs of said one tube section having perforations therein adapted for diffusing and distributing air along the adjacent surrounding portion of the filter bag when a periodic reverse purge of air is directed into said one tube section of said tube, and said troughs of the other of said tube sections being of open construction between said peaks so that said other tube section is adapted to serve only to hold the adjacent surrounding portion of the filter bag in the generally open tubular configuration without effecting any significant air diffusion or distribution of the air during the periodic reverse purge.

* * * * *

UNITED STATES PATENT AND TRADEMARK OFFICE
CERTIFICATE OF CORRECTION

PATENT NO. : 4,324,571

DATED : April 13, 1982

INVENTOR(S) : Allen S. Johnson, Jr.

It is certified that error appears in the above-identified patent and that said Letters Patent is hereby corrected as shown below:

Column 9, Claim 1, line 39, after "cent" insert
-- surrounding --.

Signed and Sealed this

Twentieth Day of July 1982

[SEAL]

Attest:

GERALD J. MOSSINGHOFF

Attesting Officer

Commissioner of Patents and Trademarks